(12) United States Patent
Li et al.

(10) Patent No.: US 11,531,482 B2
(45) Date of Patent: *Dec. 20, 2022

(54) DATA DEDUPLICATION METHOD AND APPARATUS

(71) Applicant: Huawei Technologies Co., Ltd., Shenzhen (CN)

(72) Inventors: Yuguo Li, Shenzhen (CN); Jun You, Chengdu (CN); Zongquan Zhang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 248 days.

This patent is subject to a terminal disclaimer.

(21) Appl. No.: 16/738,401

(22) Filed: Jan. 9, 2020

(65) Prior Publication Data

US 2020/0150890 A1 May 14, 2020

Related U.S. Application Data

(63) Continuation of application No. 15/403,318, filed on Jan. 11, 2017, now Pat. No. 10,564,880, which is a
(Continued)

(30) Foreign Application Priority Data

Sep. 17, 2014 (CN) .......................... 201410475287.3

(51) Int. Cl.
*G06F 3/06* (2006.01)
*G06F 21/60* (2013.01)
(Continued)

(52) U.S. Cl.
CPC ............ *G06F 3/0641* (2013.01); *G06F 3/067* (2013.01); *G06F 3/0608* (2013.01); *G06F 11/14* (2013.01);
(Continued)

(58) Field of Classification Search
CPC ............ G06F 16/1748; G06F 11/1453; G06F 11/1451; G06F 11/1458; G06F 11/1464;
(Continued)

(56) References Cited

U.S. PATENT DOCUMENTS 8,904,120 B1 12/2014 Killamsetti et al.
9,773,007 B1 9/2017 Golden et al.
(Continued)

FOREIGN PATENT DOCUMENTS

CN 101833496 A 9/2010
CN 102968597 A 3/2013
(Continued)

OTHER PUBLICATIONS

Machine Translation and Abstract of Chinese Publication No. CN101833496, Sep. 15, 2010, 9 pages.
(Continued)

*Primary Examiner* — Angelica Ruiz
(74) *Attorney, Agent, or Firm* — Conley Rose, P.C.

(57) ABSTRACT

A data deduplication method includes receiving an overwrite request sent by an external device, where the overwrite request carries a data block and a first address into which the data block is to be stored, determining whether an overwrite quantity of the first address exceeds a first threshold within a time period [t1, t2], where both t1 and t2 are time points, and t2 is later than t1, and when the overwrite quantity of the first address exceeds the first threshold within the time period [t1, t2], skipping performing a deduplication operation on the data block or when the overwrite quantity of the first address does not exceed the first threshold within the time period [t1, t2], performing a deduplication operation on the data block.

20 Claims, 4 Drawing Sheets

Receive an overwrite request sent by an external device, where the overwrite request carries a data block and a first address into which the data block is to be stored — S101

Determine whether an overwrite quantity of the first address exceeds a first threshold within a time period [t1, t2], where both t1 and t2 are time points, and t2 is later than t1; and when the overwrite quantity of the first address exceeds the first threshold within the time period [t1, t2], skip performing a deduplication operation on the data block; when the overwrite quantity of the first address does not exceed the first threshold within the time period [t1, t2], perform a deduplication operation on the data block — S102

Related U.S. Application Data continuation of application No. PCT/CN2015/080906, filed on Jun. 5, 2015.

(51) Int. Cl.
*G06F 11/14* (2006.01)
*G06F 16/174* (2019.01)

(52) U.S. Cl.
CPC ...... *G06F 11/1453* (2013.01); *G06F 16/1748* (2019.01); *G06F 21/60* (2013.01); *G06F 2201/81* (2013.01)

(58) Field of Classification Search
CPC ... G06F 3/0481; G06F 3/0619; G06F 2201/80
See application file for complete search history.

(56) References Cited

U.S. PATENT DOCUMENTS

| | | |
|---|---|---|
| 2009/0271454 A1 | 10/2009 | Anglin et al. |
| 2011/0055471 A1 | 3/2011 | Thatcher et al. |
| 2012/0109894 A1 | 5/2012 | Kishi |
| 2012/0257626 A1 | 10/2012 | McGhee et al. |
| 2013/0073821 A1* | 3/2013 | Flynn .................... G11C 16/06 711/162 |
| 2013/0086006 A1 | 4/2013 | Colgrove et al. |
| 2013/0117286 A1 | 5/2013 | Gallant et al. |
| 2013/0117515 A1 | 5/2013 | Ashmore et al. |
| 2013/0117516 A1* | 5/2013 | Sobolewski .......... G06F 3/0619 711/162 |
| 2014/0114932 A1 | 4/2014 | Mallaiah et al. |
| 2014/0201171 A1 | 7/2014 | Vijayan et al. |
| 2014/0337562 A1* | 11/2014 | Long .................... G06F 12/0804 711/103 |
| 2015/0006475 A1* | 1/2015 | Guo ..................... G06F 16/1752 707/693 |

FOREIGN PATENT DOCUMENTS

| | | |
|---|---|---|
| CN | 103294957 A | 9/2013 |
| CN | 104239518 A | 12/2014 |
| EP | 2765524 A1 | 8/2014 |
| EP | 2770446 A1 | 8/2014 |

OTHER PUBLICATIONS

Machine Translation and Abstract of Chinese Publication No. CN102968597, Mar. 13, 2013, 6 pages.
Machine Translation and Abstract of Chinese Publication No. CN103294957, Sep. 11, 2013, 9 pages.
Machine Translation and Abstract of Chinese Publication No. CN104239518, Dec. 24, 2014, 8 pages.
Foreign Communication From A Counterpart Application, European Application No. 15841499.5, Extended European Search Report dated May 2, 2017, 7 pages.
Foreign Communication From A Counterpart Application, PCT Application No. PCT/CN2015/080906, English Translation of International Search Report dated Aug. 26, 2015, 2 pages.
Foreign Communication From A Counterpart Application, PCT Application No. PCT/CN2015/080906, English Translation of Written Opinion dated Aug. 26, 2015, 6 pages.
Office Action dated Jan. 28, 2019, 16 pages, U.S. Appl. No. 15/403,318, filed Jan. 11, 2017.
Office Action dated Jul. 30, 2019, 12 pages, U.S. Appl. No. 15/403,318, filed Jan. 11, 2017.

\* cited by examiner

DATA DEDUPLICATION METHOD AND APPARATUS

CROSS-REFERENCE TO RELATED APPLICATION

This application is a continuation of U.S. patent application Ser. No. 15/403,318 filed on Jan. 11, 2017, which is a continuation of International Patent Application No. PCT/CN2015/080906 filed on Jun. 5, 2015, which claims priority to Chinese Patent Application No. 201410475287.3 filed on Sep. 17, 2014. All of the aforementioned patent applications are hereby incorporated by reference in their entireties.

TECHNICAL FIELD

Embodiments of the present disclosure relate to computer technologies, and in particular, to a data deduplication method and apparatus.

BACKGROUND

In other approaches, a storage server performs deduplication and compression processing on all received data. When an external device sends data to a logical address (assumed to be an address 0) of the storage server, the storage server first partitions the data to obtain a data block, calculates a fingerprint of the data block using a corresponding hash algorithm after the partitioning, and transmits the fingerprint of the data block to a fingerprint library for querying (the fingerprint library stores a fingerprint corresponding to a data block that has been stored in storage space), to determine whether the data block is a duplicate data block. When the data block is a duplicate data block, a deduplication operation is performed, that is, the duplicate data block is deleted, a reference quantity of a data block (an address of the data block that is the same as the duplicate data block is an address 1 in the storage space, and the address 1 is a physical address), which is the same as the duplicate data block, in the storage space is increased by 1, and the address 0 is directed to the address 1. When the data block is a unique data block, the data block is stored into the storage space. Certainly, before the data block is stored, a compression operation may be performed on the data block, and a physical address is allocated correspondingly to store the data block.

However, after the duplicate data block in the address 0 is deleted, the external device may still continuously send a write request to the address, to overwrite data in the address 0. Therefore, the foregoing deduplication operation performed on the data in the address 0 makes no sense, thereby wasting computing resources of the storage server.

SUMMARY

Embodiments of the present disclosure provide a data deduplication method and apparatus, to resolve a technical problem that storage server resources are wasted when a deduplication operation is performed on a data block.

According to a first aspect, an embodiment of the present disclosure provides a data deduplication method, including receiving an overwrite request sent by an external device, where the overwrite request carries a data block and a first address into which the data block is to be stored; determining whether an overwrite quantity of the first address exceeds a first threshold within a time period [t1, t2], where both t1 and t2 are time points, and t2 is later than t1; and when the overwrite quantity of the first address exceeds the first threshold within the time period [t1, t2], skipping performing a deduplication operation on the data block; or when the overwrite quantity of the first address does not exceed the first threshold within the time period [t1, t2], performing a deduplication operation on the data block.

With reference to the first aspect, in a first possible implementation manner of the first aspect, the determining whether an overwrite quantity of the first address exceeds a first threshold within a time period [t1, t2] includes querying whether a first record table includes the first address, where the first record table is used to record an address whose overwrite quantity exceeds the first threshold within the time period [t1, t2].

With reference to the first aspect or the first possible implementation manner of the first aspect, in a second possible implementation manner of the first aspect, when the overwrite quantity of the first address does not exceed the first threshold within the time period [t1, t2], the method further includes increasing, by 1, the overwrite quantity of the first address within the time period [t1, t2].

With reference to the second possible implementation manner of the first aspect, in a third possible implementation manner of the first aspect, when the overwrite quantity of the first address exceeds the first threshold within the time period [t1, t2], the method further includes recording the first address into the first record table, and directing the first address to a second address in a lookup table, where the lookup table includes a mapping relationship between the second address and a fingerprint of the data block.

With reference to the third possible implementation manner of the first aspect, in a fourth possible implementation manner of the first aspect, the method further includes, when an overwrite quantity of the first address does not exceed a second threshold within a time period [t2, t3], deleting the first address from the first record table, where t3 is a time point later than t2.

With reference to the third possible implementation manner of the first aspect, in a fifth possible implementation manner of the first aspect, the method further includes receiving a read request sent by the external device, where the read request carries the first address; and when a quantity of times of reading the first address within a time period [t2, t4] exceeds a third threshold, restoring a data block on which the deduplication operation is performed for the last time in the first address, where t4 is a time point later than t2.

With reference to the fifth possible implementation manner of the first aspect, in a sixth possible implementation manner of the first aspect, the restoring a data block on which the deduplication operation is performed for the last time in the first address includes reading a data block in the second address; restoring the data block in the second address, to obtain the data block on which the deduplication operation is performed for the last time in the first address; and storing the data block on which the deduplication operation is performed for the last time in the first address into a third address, and marking the first address as an address for which no deduplication operation is performed.

According to a second aspect, an embodiment of the present disclosure provides a data deduplication apparatus, including a receiving module configured to receive an overwrite request sent by an external device, where the overwrite request carries a data block and a first address into which the data block is to be stored; a determining module configured to determine whether an overwrite quantity of the first address exceeds a first threshold within a time period [t1, t2], where both t1 and t2 are time points, and t2 is later than t1; and a deduplication module configured to, when the determining module determines that the overwrite quantity of the first address exceeds the first threshold within the time period [t1, t2], skip performing a deduplication operation on the data block; or when the determining module determines that the overwrite quantity of the first address does not exceed the first threshold within the time period [t1, t2], perform a deduplication operation on the data block.

With reference to the second aspect, in a first possible implementation manner of the second aspect, the determining module is configured to query whether a first record table includes the first address, where the first record table is used to record an address whose overwrite quantity exceeds the first threshold within the time period [t1, t2].

With reference to the second aspect or the first possible implementation manner of the second aspect, in a second possible implementation manner of the second aspect, the apparatus further includes a counting module configured to, when the determining module determines that the overwrite quantity of the first address does not exceed the first threshold within the time period [t1, t2], increase, by 1, the overwrite quantity of the first address within the time period [t, t2].

With reference to the second possible implementation manner of the second aspect, in a third possible implementation manner of the second aspect, the apparatus further includes a recording module configured to, when the determining module determines that the overwrite quantity of the first address exceeds the first threshold within the time period [t1, t2], record the first address into the first record table, and direct the first address to a second address in a lookup table, where the lookup table includes a mapping relationship between the second address and a fingerprint of the data block.

With reference to the third possible implementation manner of the second aspect, in a fourth possible implementation manner of the second aspect, the recording module is further configured to, when an overwrite quantity of the first address does not exceed a second threshold within a time period [t2, t3], delete the first address from the first record table, where t3 is a time point later than t2.

With reference to the third possible implementation manner of the second aspect, in a fifth possible implementation manner of the second aspect, the receiving module is further configured to receive a read request sent by the external device, where the read request carries the first address; and the apparatus further includes a data restoration module, further configured to, when the determining module determines that a quantity of times of reading the first address within a time period [t2, t4] exceeds a third threshold, restore a data block on which the deduplication operation is performed for the last time in the first address, where t4 is a time point later than t2.

With reference to the fifth possible implementation manner of the second aspect, in a sixth possible implementation manner of the second aspect, the data restoration module includes a data reading unit configured to read a data block in the second address; a data restoration unit configured to restore the data block in the second address, to obtain the data block on which the deduplication operation is performed for the last time in the first address; and a storage marking unit configured to store the data block on which the deduplication operation is performed for the last time in the first address into a third address, and mark the first address as an address for which no deduplication operation is performed.

According to a third aspect, an embodiment of the present disclosure provides a data deduplication apparatus, including a central processing unit and a memory, where the central processing unit communicates with the memory using a bus, the memory stores a computer execution instruction, and the central processing unit performs the computer execution instruction, to perform any one of the first aspect or the first to the sixth possible implementation manners of the first aspect.

According to the data deduplication method and apparatus provided in the embodiments of the present disclosure, a storage server receives an overwrite request that is sent by an external device and that carries a data block and a first address, determines whether an overwrite quantity of the first address exceeds a first threshold within a time period [t1, t2], and when determining that the overwrite quantity of the first address exceeds the first threshold within the time period [t1, t2], does not perform a deduplication operation on the data block in the first address. Therefore, a large quantity of computing resources of the storage server are saved, and impact brought by a deduplication operation on storage server performance is also decreased.

BRIEF DESCRIPTION OF DRAWINGS

To describe the technical solutions in the embodiments of the present disclosure more clearly, the following briefly describes the accompanying drawings required for describing the embodiments.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure.

Figure 1:
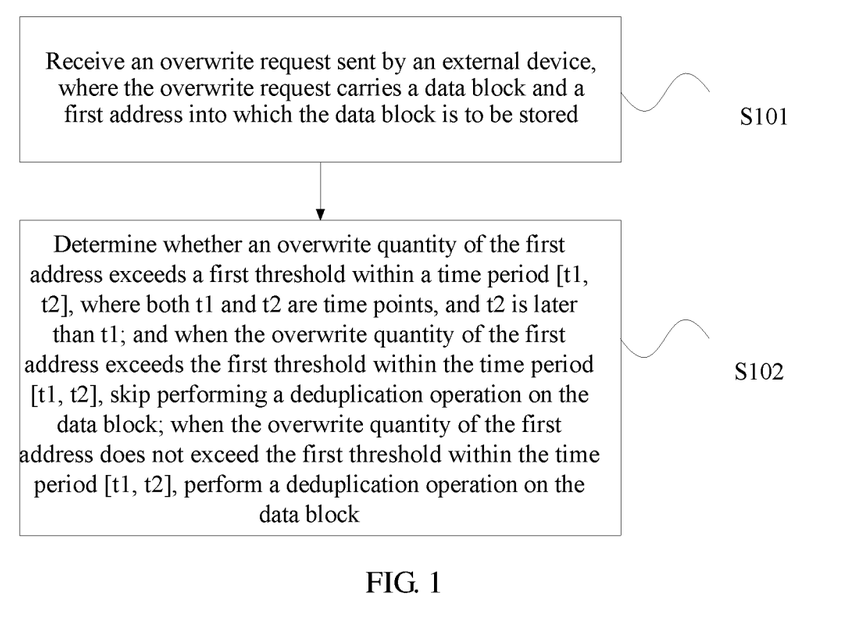
FIG. 1 is a schematic flowchart of Embodiment 1 of a data deduplication method according to the present disclosure.

FIG. 1 is a schematic flowchart of Embodiment 1 of a data deduplication method according to the present disclosure. In the following, data deduplication is referred to as deduplication for short. The method may be performed by a storage server, for example, by a deduplication module in the storage server. As shown in FIG. 1, the method includes the following steps.

S101. Receive an overwrite request sent by an external device, where the overwrite request carries a data block and a first address into which the data block is to be stored.

Figure 2:
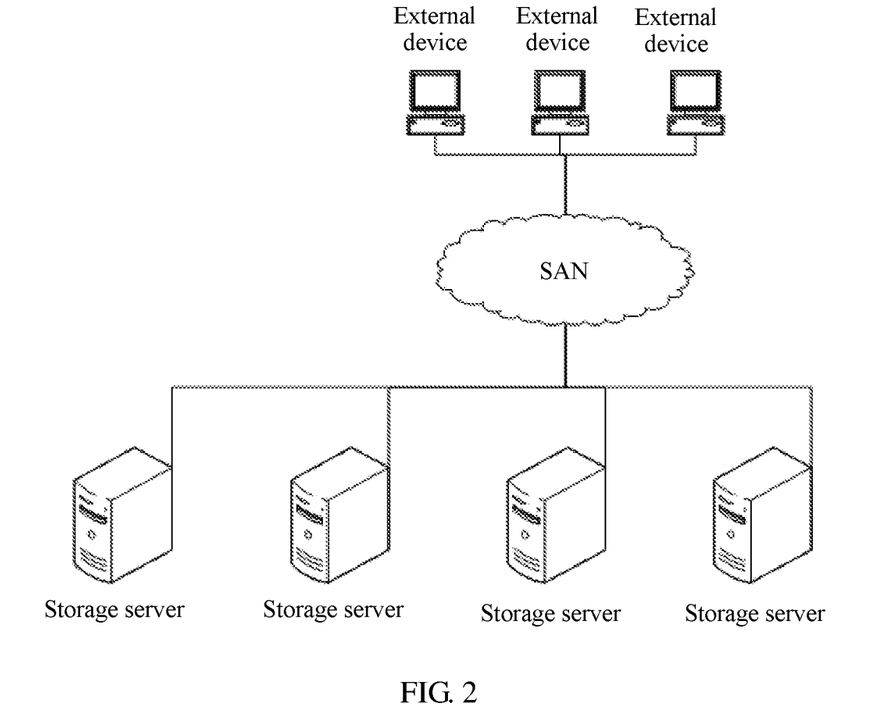
FIG. 2 is a topology diagram of a storage system network according to the present disclosure.

This embodiment of the present disclosure may be applied to a topology diagram of a storage system network shown in FIG. 2. The external device sends the overwrite request to the storage server by way of a data storage network, such as a storage area network (SAN), and the overwrite request carries the data block and the first address into which the data block is to be stored. Optionally, the first address may be a logical address.

S102. Determine whether an overwrite quantity of the first address exceeds a first threshold within a time period [t1, t2], where both t1 and t2 are time points, and t2 is later than t1; and when the overwrite quantity of the first address exceeds the first threshold within the time period [t1, t2], skip performing a deduplication operation on the data block; when the overwrite quantity of the first address does not exceed the first threshold within the time period [t1, t2], perform a deduplication operation on the data block.

After receiving the foregoing overwrite request, the storage server determines whether the overwrite quantity of the first address carried in the overwrite request exceeds the first threshold within the time period [t1, t2]. Optionally, the time period [t1, t2] may be set using corresponding software, for example, using timing software of a timer. The first threshold may be a threshold set according to actual requirements.

When the storage server determines that the overwrite quantity of the first address exceeds the first threshold within the time period [t1, t2], the storage server does not perform a deduplication operation on the foregoing data block. For example, the data block is written into a corresponding physical address or logical address according to the first address (because the storage server knows that data blocks are to arrive at the first address continuously in a short time, the storage server does not perform a deduplication operation on the data block any more).

When the storage server determines that the overwrite quantity does not exceed the first threshold within the time period [t1, t2], the storage server performs a deduplication operation on the data block. That is, when the data block is a duplicate data block, the duplicate data block is deleted; when the data block is a unique data block, the data block is kept, and a fingerprint and a reference quantity of the data block are recorded. Optionally, the data block may be compressed, and the compressed data block is stored into a physical address or logical address according to the first address; or the data block may be directly stored into a physical address or logical address according to the first address without compression.

Because the foregoing storage server has determined whether the overwrite quantity of the first address exceeds the first threshold within the time period [t1, t2], the storage server performs a deduplication operation on a data block in an address whose overwrite quantity does not exceed the first threshold, and does not perform a deduplication operation on a data block in an address whose overwrite quantity exceeds the first threshold. Therefore, a large quantity of computing resources of the storage server are saved, and impact brought by a deduplication operation on storage server performance is also decreased.

According to the data deduplication method provided in this embodiment of the present disclosure, a storage server receives an overwrite request that is sent by an external device and that carries a data block and a first address, determines whether an overwrite quantity of the first address exceeds a first threshold within a time period [t1, t2], and does not perform a deduplication operation on the data block in the first address when determining that the overwrite quantity of the first address exceeds the first threshold within the time period [t1, t2]. Therefore, a large quantity of computing resources of the storage server are saved, and impact brought by a deduplication operation on storage server performance is also decreased.

Based on the foregoing embodiment, a method involved in this embodiment is a process in which the storage server determines whether to perform a deduplication operation on the data block in the first address according to a first record table. Based on the foregoing embodiment shown in FIG. 1, further, S102 includes querying whether the first record table includes the first address, where the first record table is used to record an address whose overwrite quantity exceeds the first threshold within the time period [t1, t2].

After receiving the foregoing overwrite request, the storage server queries whether the first record table includes the first address carried in the overwrite request. The first record table may include one or more addresses. These addresses all are addresses whose overwrite quantities exceed the first threshold within the time period [t1, t2], that is, addresses that have a relatively high overwrite probability, and these addresses all may be logical addresses. Optionally, these addresses may exist in the first record table in an address set form, or may exist in a form of a mapping relationship between an address and an overwrite quantity of the address. No limitation is imposed on a storage form of an address in the first record table in this embodiment of the present disclosure.

When the storage server determines that the first record table includes the first address, the storage server does not perform a deduplication operation on the foregoing data block. For example, the data block is written into a corresponding physical address or logical address according to the first address (because the storage server knows that data blocks are to arrive at the first address continuously in a short time, the storage server does not perform a deduplication operation on the data block any more).

When the storage server determines that the first record table does not include the first address (that is, the overwrite quantity of the first address does not exceed the first threshold within the time period [t1, t2]), the storage server performs a deduplication operation on the data block. That is, when the data block is a duplicate data block, the duplicate data block is deleted; when the data block is a unique data block, the data block is stored, and a fingerprint and a reference quantity of the data block are recorded. Optionally, the data block may be compressed, and the compressed data block is stored into a physical address or logical address according to the first address; or the data block may be directly stored into a physical address or logical address according to the first address without compression.

According to the data deduplication method provided in this embodiment of the present disclosure, a storage server receives an overwrite request that is sent by an external device and that carries a data block and a first address, queries whether a first record table includes the first address, and does not perform a deduplication operation on the data block in the first address when the first record table includes the first address. Therefore, a large quantity of computing resources of the storage server are saved, and impact brought by a deduplication operation on storage server performance is also decreased.

Based on the foregoing embodiments, when the storage server determines that the first record table does not include the first address, that is, when the storage server determines that the overwrite quantity of the first address does not exceed the first threshold within the time period [t1, t2], the storage server increases, by 1, the overwrite quantity of the first address within the time period [t1, t2]. When overwriting is performed in the first address again, the storage server still determines whether the first record table includes the first address. When the first record table does not include the first table, the storage server not only performs a deduplication operation on the data block in the first address, but also increases, by 1, the overwrite quantity of the first address within the time period [t1, t2], and so on.

When a overwrite quantity of the foregoing first address exceeds the first threshold within the time period [t1, t2], the storage server records the first address into the first record table, and directs the first address to a second address in a lookup table. The lookup table includes a mapping relationship between the second address and a fingerprint of the data block.

To describe technical solutions in this embodiment more conveniently, a simple example is described herein.

It is assumed that the first threshold is 10, and the first record table does not include the first address (that is, the overwrite quantity of the first address does not exceed the first threshold within the time period [t1, t2]), the storage server needs to perform a deduplication operation on the foregoing data block that is to be stored into the first address, and increases, by 1, the overwrite quantity of the first address within the time period [t1, t2]. It is assumed that after the overwrite quantity is increased by 1, when a current overwrite quantity of the first address is 9 within the time period [t1, t2], when overwriting occurs in the first address for a tenth time (that is, what the storage server receives is still an overwrite request for writing a data block into the first address), the storage server still performs a deduplication operation on the foregoing data block that is to be stored into the first address. However, in this case, the storage server stores the first address into the first record table.

If a data block on which overwrite occurs in the first address for a tenth time is a unique data block, after performing a deduplication operation on the data block, the storage server stores a compressed data block into the second address (the second address is a new address, in the lookup table, that is allocated by the storage server to the unique data block, and the storage server establishes a mapping relationship between the unique data block and the second address) in the lookup table, and directs the first address to the second address. In this case, the external device can indirectly access a data block in the second address when accessing the first address.

When a data block on which overwrite occurs in the first address for a tenth time is a duplicate data block, after performing a deduplication operation on the data block, the storage server searches, in the lookup table according to a fingerprint of the duplicate data block in the first address, for an address for storing the duplicate data block. Because the fingerprint of the duplicate data block corresponds to the second address (that is, a data block stored in the second address is the same as the duplicate data block) in the lookup table, the storage server directs the first address to the second address. In this case, the external device may alternatively indirectly access the data block in the second address when accessing the first address.

Further, after the first address is recorded into the first record table, the storage server sill detects whether an overwrite quantity of the first address exceeds a second threshold within a time period [t2, t3]. When the overwrite quantity of the first address does not exceed the second threshold, it indicates that within the time period [t2, t3], an overwrite probability of the first address is very low or no overwrite occurs at all; the storage server deletes the first address from the first record table. Optionally, the second threshold may be 0, or may be an integer greater than 0. The foregoing t3 is a time point later than t2.

Figure 3:
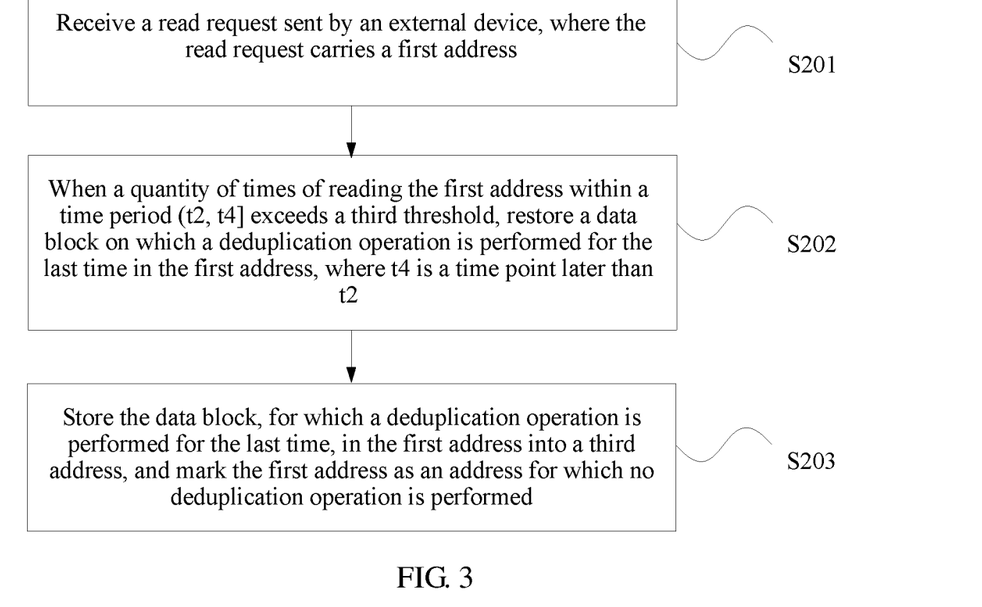
FIG. 3 is a schematic flowchart of Embodiment 2 of a data deduplication method according to the present disclosure.

FIG. 3 is a schematic flowchart of Embodiment 2 of a data deduplication method according to an embodiment of the present disclosure. The method involved in this embodiment is a specific process in which after a first address is recorded into a first record table, when determining a quantity of times of reading the first address by an external device exceeds a particular threshold, a storage server restores a data block, for which a deduplication operation is performed for the last time, in the first address. As shown in FIG. 3, the method includes the following steps.

S201. Receive a read request sent by the external device, where the read request carries the first address.

S202. When a quantity of times of reading the first address within a time period [t2, t4] exceeds a third threshold, restore a data block on which the deduplication operation is performed for the last time in the first address, where t4 is a time point later than t2.

After receiving the read request for reading a data block in the first address by the external device, the storage server determines whether the quantity of times of reading the first address within the time period [t2, t4] exceeds the third threshold. When the quantity of times of reading the first address exceeds the third threshold, it indicates that a probability of reading the first address is extremely high within the time period [t2, t4]. However, each time the external device reads the first address, the storage server indirectly accesses a second address, thereby causing an access delay. Therefore, to decrease the access delay, the storage server restores the data block, for which a deduplication operation is performed for the last time, in the first address. The storage server reads a data block in the second address (because the first address is directed to the second address, the data block in the second address is the same as the data block, for which a deduplication and compression operation is performed for the last time, in the first address), and restores the data block in the second address, to obtain the data block on which the deduplication operation is performed for the last time in the first address. Optionally, if the data block is compressed when stored into the second address, the restoration herein is to decompress the data block. Optionally, the foregoing third threshold may be a threshold set according to actual requirements.

S203. Store the data block, for which a deduplication operation is performed for the last time, in the foregoing first address into a third address, and mark the foregoing first address as an address for which no deduplication operation is performed.

According to the data deduplication method provided in this embodiment of the present disclosure, after determining that a quantity of times of reading a first address in a first record table within a time period [t2, t4] exceeds a third threshold, a storage server restores a data block, for which a deduplication operation is performed, in the first address. Therefore, a delay generated when an external device accesses the first address is decreased.

Persons of ordinary skill in the art may understand that all or some of the steps of the foregoing method embodiments may be implemented by a program instructing relevant hardware. The foregoing program may be stored in a computer-readable storage medium. When the program runs, the steps of the foregoing method embodiments are performed.

The foregoing storage medium includes any medium that can store program code, such as a ROM, a RAM, a magnetic disk, or an optical disc.

Figure 4:
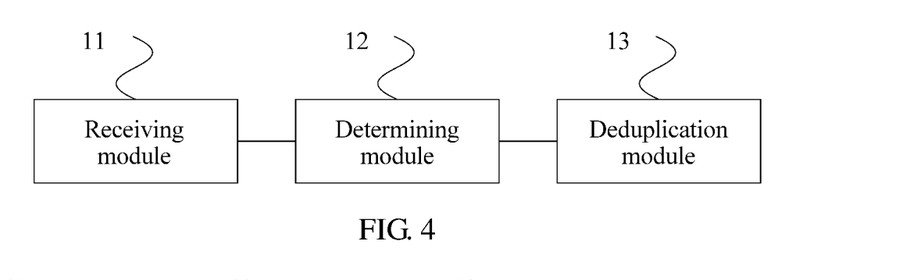
FIG. 4 is a schematic structural diagram of Embodiment 1 of a data deduplication apparatus according to an embodiment of the present disclosure.

FIG. 4 is a schematic structural diagram of Embodiment 1 of a data deduplication apparatus according to an embodiment of the present disclosure. The apparatus may be a storage server in a storage system, or may be integrated into a storage server. As shown in FIG. 4, the apparatus includes a receiving module 11, a determining module 12, and a deduplication module 13. The receiving module 11 is configured to receive an overwrite request sent by an external device, where the overwrite request carries a data block and a first address into which the data block is to be stored; the determining module 12 is configured to determine whether an overwrite quantity of the first address exceeds a first threshold within a time period [t1, t2], where both t1 and t2 are time points, and t2 is later than t1; the deduplication module 13 is configured to, when the determining module 12 determines that the overwrite quantity of the first address exceeds the first threshold within the time period [t1, t2], skip performing a deduplication operation on the data block; or when the determining module 12 determines that the overwrite quantity of the first address does not exceed the first threshold within the time period [t1, t2], perform a deduplication operation on the data block.

The data deduplication apparatus provided in this embodiment of the present disclosure can perform the foregoing data deduplication method embodiments. Implementation principles and technical effects of the apparatus and the method are similar, and details are not described herein.

Further, the determining module 12 is configured to query whether a first record table includes the first address, where the first record table is used to record an address whose overwrite quantity exceeds the first threshold within the time period [t1, t2].

The data deduplication apparatus provided in this embodiment of the present disclosure can perform the foregoing data deduplication method embodiments. Implementation principles and technical effects of the apparatus and the method are similar, and details are not described herein.

Figure 5:
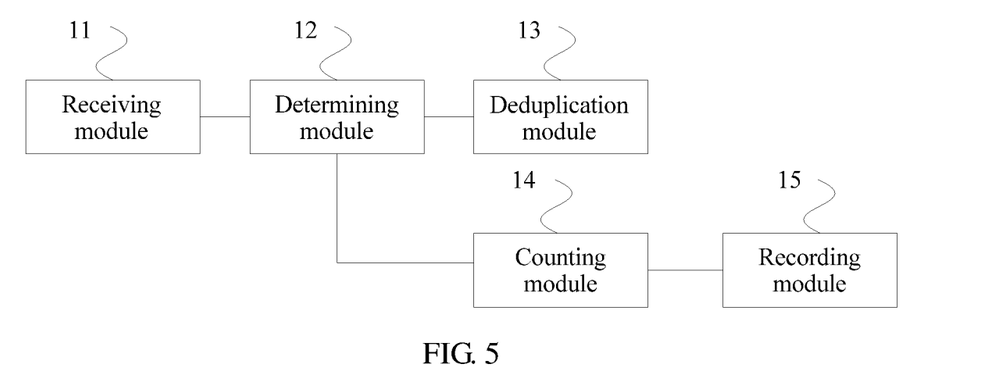
FIG. 5 is a schematic structural diagram of Embodiment 2 of a data deduplication apparatus according to an embodiment of the present disclosure.

FIG. 5 is a schematic structural diagram of Embodiment 2 of a data deduplication apparatus according to an embodiment of the present disclosure. Based on the foregoing embodiment shown in FIG. 4, further, the apparatus may further include a counting module 14 configured to, when the determining module 12 determines that the overwrite quantity of the first address does not exceed the first threshold within the time period [t1, t2], increase, by 1, the overwrite quantity of the first address within the time period [t1, t2]; a recording module 15 configured to, when the determining module 12 determines that the overwrite quantity of the first address exceeds the first threshold within the time period [t1, t2], record the first address into the first record table, and direct the first address to a second address in a lookup table, where the lookup table includes a mapping relationship between the second address and a fingerprint of the data block.

Further, the recording module 15 is further configured to, when an overwrite quantity of the first address does not exceed a second threshold within a time period [t2, t3], delete the first address from the first record table, where t3 is a time point later than t2.

The data deduplication apparatus provided in this embodiment of the present disclosure can perform the foregoing data deduplication method embodiments. Implementation principles and technical effects of the apparatus and the method are similar, and details are not described herein.

Figure 6:
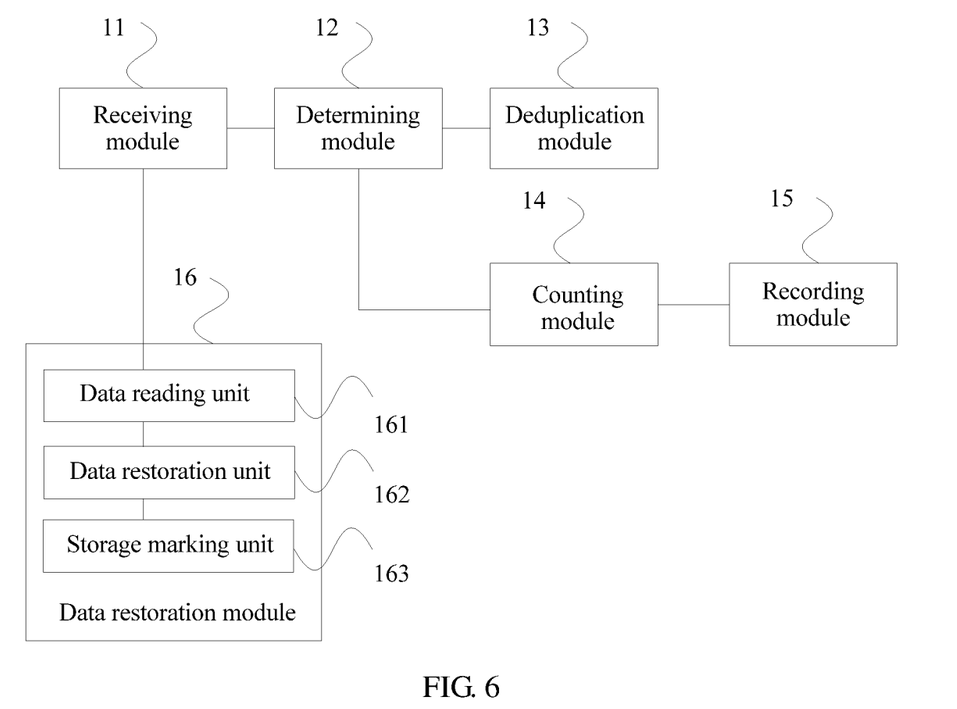
FIG. 6 is a schematic structural diagram of Embodiment 3 of a data deduplication apparatus according to an embodiment of the present disclosure.

FIG. 6 is a schematic structural diagram of Embodiment 3 of a data deduplication apparatus according to an embodiment of the present disclosure. Based on the foregoing embodiment shown in FIG. 5, the receiving module 11 is further configured to receive a read request sent by the external device, where the read request carries the first address. The apparatus may further include a data restoration module 16, further configured to, when the determining module 12 determines that a quantity of times of reading the first address within a time period [t2, t4] exceeds a third threshold, restore a data block on which the deduplication operation is performed for the last time in the first address, where t4 is a time point later than t2.

Further, the data restoration module 16 may include a data reading unit 161 configured to read a data block in the second address; a data restoration unit 162 configured to restore the data block in the second address, to obtain the data block on which the deduplication operation is performed for the last time in the first address; and a storage marking unit 163 configured to store the data block on which the deduplication operation is performed for the last time in the first address into a third address, and mark the first address as an address for which no deduplication operation is performed.

The data deduplication apparatus provided in this embodiment of the present disclosure can perform the foregoing data deduplication method embodiments. Implementation principles and technical effects of the apparatus and the method are similar, and details are not described herein.

Figure 7:
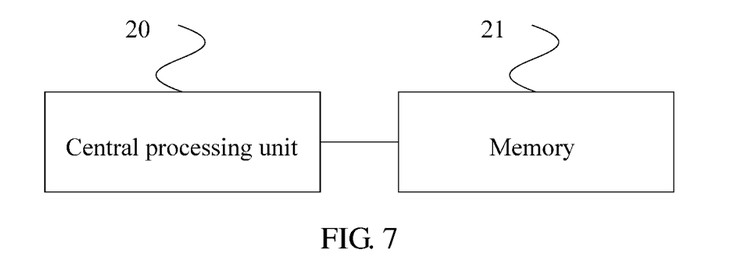
FIG. 7 is a schematic structural diagram of Embodiment 4 of a data deduplication apparatus according to an embodiment of the present disclosure.

FIG. 7 is a schematic structural diagram of Embodiment 4 of a data deduplication apparatus according to an embodiment of the present disclosure. As shown in FIG. 7, the apparatus may include a central processing unit 20 and a memory 21. The central processing unit 20 communicates with the memory 21 using a bus. The memory 21 stores a computer execution instruction. The central processing unit 20 performs the computer execution instruction, to perform the technical solutions shown in the method embodiments of the present disclosure. Implementation principles and technical effects of the apparatus and the method are similar, and details are not described herein.

What is claimed is:

1. A data deduplication method, comprising:
   receiving an overwrite request from an external device, wherein the overwrite request carries a data block and a first address into which the data block is to be stored;
   querying whether a quantity of one or more overwrites that correspond to the first address and that are performed within a time period exceeds a first threshold; and
   performing a deduplication operation on the data block when the quantity of the one or more overwrites that correspond to the first address and that are performed within the time period does not exceed the first threshold.

2. The data deduplication method of claim 1, further comprising increasing a count indicating the quantity of the one or more overwrites that correspond to the first address and that are performed within the time period by one when the write quantity of the first address does not exceed the first threshold within the time period.

3. The data deduplication method of claim 1, further comprising directing the first address to a second address in a lookup table, wherein the lookup table comprises a mapping relationship between the second address and a fingerprint of the data block.

4. The data deduplication method of claim 3, further comprising:
  receiving a read request from the external device, wherein the read request carries the first address; and
  restoring the data block according to the mapping relationship between the second address and the fingerprint of the data block.

5. A data deduplication apparatus, comprising:
  an interface configured to receive an overwrite request from an external device, wherein the overwrite request carries a data block and a first address into which the data block is to be stored; and
  a hardware processor coupled to the interface and configured to:
    query whether a quantity of one or more overwrites that correspond to the first address and that are performed within a time period exceeds a first threshold; and
    perform a deduplication operation on the data block when the quantity of the one or more overwrites that correspond to the first address and that are performed within the time period does not exceed the first threshold.

6. The data deduplication apparatus of claim 5, wherein the hardware processor is further configured to increase a count indicating the quantity of the one or more overwrites that correspond to the first address and that are performed within the time period by one when the quantity of the one or more overwrites that correspond to the first address and that are performed within the time period does not exceed the first threshold.

7. The data deduplication apparatus of claim 6, wherein the hardware processor is further configured to direct the first address to a second address in a lookup table, and wherein the lookup table comprises a mapping relationship between the second address and a fingerprint of the data block.

8. The data deduplication apparatus of claim 7, wherein the hardware processor is further configured to:
  receive a read request from the external device, wherein the read request carries the first address; and
  restore the data block according to the mapping relationship between the second address and the fingerprint of the data block.

9. The data deduplication apparatus of claim 5, wherein the data deduplication apparatus comprises a storage server.

10. The data deduplication apparatus of claim 9, wherein the storage server and the external device are communicatively coupled using a storage area network.

11. The data deduplication apparatus of claim 10, wherein the storage server comprises a group of storage servers, and wherein the group of storage servers is communicatively coupled to the external device using the storage area network.

12. The data deduplication apparatus of claim 5, wherein the hardware processor is further configured to:
  compress data in the data block to form compressed data; and
  store the compressed data to the first address.

13. A computer program product comprising computer-executable instructions that are stored on a non-transitory computer-readable medium and that when executed by a processor, cause an apparatus to:
  receive an overwrite request from an external device, wherein the overwrite request carries a data block and a first address into which the data block is to be stored;
  query whether a quantity of one or more overwrites that correspond to the first address and that are performed within a time period exceeds a first threshold; and
  perform a deduplication operation on the data block when the quantity of the one or more overwrites that correspond to the first address and that are performed within the time period does not exceed the first threshold.

14. The computer program product of claim 13, wherein the computer-executable instructions further cause the apparatus to increase a count indicating the quantity of the one or more overwrites that correspond to the first address and that are performed within the time period by one when the quantity of the one or more overwrites that correspond to the first address and that are performed within the time period does not exceed the first threshold.

15. The computer program product of claim 13, wherein the computer-executable instructions further cause the apparatus to direct the first address to a second address in a lookup table, wherein the lookup table comprises a mapping relationship between the second address and a fingerprint of the data block.

16. The computer program product of claim 15, wherein the computer-executable instructions further cause the apparatus to:
  receive a read request from the external device, wherein the read request carries the first address; and
  restore the data block according to the mapping relationship between the second address and the fingerprint of the data block.

17. The computer program product of claim 13, wherein the apparatus comprises a storage server.

18. The computer program product of claim 17, wherein the storage server and the external device are communicatively coupled using a storage area network.

19. The computer program product of claim 13, wherein the computer-executable instructions further cause the apparatus to skip performing the deduplication operation on the data block when the quantity of the one or more overwrites that correspond to the first address and that are performed within the time period exceeds the first threshold.

20. The computer program product of claim 13, wherein the computer-executable instructions further cause the apparatus to:
  add the first address to a record table or keep the first address in the record table when the quantity of the one or more overwrites that correspond to the first address and that are performed within the time period exceeds the first threshold;
  when the record table does not include the first address and the quantity of the one or more overwrites that correspond to the first address and that are performed within the time period does not exceed the first threshold, update a count indicating the quantity of the one or more overwrites that correspond to the first address and that are performed within the time period; and
  when the record table includes the first address and the quantity of the one or more overwrites that correspond to the first address and that are performed within the time period does not exceed the first threshold, remove the first address from the record table.

* * * * *